(12) United States Patent
Swierczewski (10) Patent No.: US 11,772,531 B1
(45) Date of Patent: Oct. 3, 2023

(54) AUTOMATIC EMERGENCY ADJUSTING VEHICLE SEAT

(71) Applicant: Richard Swierczewski, Toms River, NJ (US)

(72) Inventor: Richard Swierczewski, Toms River, NJ (US)

(*) Notice: Subject to any disclaimer, the term of this patent is extended or adjusted under 35 U.S.C. 154(b) by 0 days.

(21) Appl. No.: 18/110,191

(22) Filed: Feb. 15, 2023

(51) Int. Cl.
  *B60N 2/42* (2006.01)
  *B60N 2/427* (2006.01)
  *B60N 2/90* (2018.01)
  *B60N 2/16* (2006.01)

(52) U.S. Cl.
  CPC ......... *B60N 2/42754* (2013.01); *B60N 2/914* (2018.02); *B60N 2/1615* (2013.01); *B60N 2/4221* (2013.01); *B60N 2/42736* (2013.01)

(58) Field of Classification Search
  CPC ............ B60N 2/42727; B60N 2/42736; B60N 2/4279; B60N 2/4221; B60N 2/1615; B60N 2/42754
  See application file for complete search history.

(56) References Cited

U.S. PATENT DOCUMENTS

| | | |
|---|---|---|
| 2,227,717 A | 1/1941 | Jones |
| 2,789,650 A * | 4/1957 | Krous ................. B60N 2/4221 296/68.1 |
| 3,081,059 A | 3/1963 | Hastings et al. |
| 3,917,020 A * | 11/1975 | Saab ........................ B60T 1/14 296/68.1 |
| 3,953,068 A | 4/1976 | Porsche et al. |
| 4,275,914 A | 6/1981 | Holweg et al. |
| 5,292,179 A | 3/1994 | Forget |
| 5,344,204 A | 9/1994 | Liu |
| 5,553,924 A | 9/1996 | Cantor et al. |
| 5,556,160 A | 9/1996 | Mikami |
| 5,605,372 A | 2/1997 | Al-Abdullateef |
| RE35,572 E | 7/1997 | Lloyd et al. |
| 5,743,591 A | 4/1998 | Tame |
| 6,022,074 A | 2/2000 | Swedenklef |
| 6,386,631 B1 * | 5/2002 | Masuda ............. B60N 2/42763 297/284.11 |

(Continued)

FOREIGN PATENT DOCUMENTS

| | | |
|---|---|---|
| DE | 2112443 | 9/1971 |
| DE | 2060951 | 6/1972 |
| GB | 2087226 | 5/1982 |

*Primary Examiner* — Syed A Islam
(74) *Attorney, Agent, or Firm* — Walter J. Tencza, Jr.

(57) ABSTRACT

A supplemental passive safety apparatus is provided which benefits known technology for detecting traffic emergencies. The apparatus may contain a movable rectangular frustum which interacts with rigid crossbars to control middle pivot joints responsible for adjusting location of horizontal support bottom panels with a cushion. An alternative apparatus may contain a rope traveling through a double flanged wheel mounting to a pneumatic cylinder instead of a rigid crossbar interacting with a movable rectangular frustum. Simultaneously with an opening of an automatic valve, compressed air is transmitted from a cartridge to a pneumatic cylinder causing a piston with rod to move toward a front crossbar. The rigid crossbar in one version or rope in an alternative version release a pivot joint controlling location of horizontal support bottom seat panels with cushion.

4 Claims, 9 Drawing Sheets

(56) References Cited

U.S. PATENT DOCUMENTS

| | | | |
|---|---|---|---|
| 6,481,777 B2 * | 11/2002 | Mans | B60N 2/4279 |
| | | | 296/68.1 |
| 6,631,955 B2 | 10/2003 | Humer et al. | |
| 6,715,788 B2 * | 4/2004 | Saiguchi | B60N 2/4279 |
| | | | 280/733 |
| 6,851,747 B2 * | 2/2005 | Swierczewski | B60N 2/4214 |
| | | | 297/216.19 |
| 7,354,106 B2 | 4/2008 | Dennis | |
| 7,588,289 B2 | 9/2009 | Bostrom et al. | |
| 8,297,698 B2 * | 10/2012 | Swierczewski | B60N 2/4279 |
| | | | 297/216.1 |
| 8,434,819 B2 * | 5/2013 | Guerrero | B60N 2/4279 |
| | | | 297/216.16 |
| 8,641,140 B2 * | 2/2014 | Swierczewski | B60N 2/4279 |
| | | | 297/216.19 |
| 9,994,131 B1 * | 6/2018 | Swierczewski | B60N 2/4221 |
| 2009/0108645 A1 | 4/2009 | Nilakantan | |

* cited by examiner

AUTOMATIC EMERGENCY ADJUSTING VEHICLE SEAT

FIELD OF THE INVENTION

The present invention relates to adjusting vehicle seats.

BACKGROUND OF THE INVENTION

A front vehicle seat has been traditionally considered to increase an occupant's safety, comfort and ergonomics while reducing the seat fabrication cost. There are many patents in the prior art that depict a vehicle seat that dissipates forces, shocks and vibrations throughout a collision as well as during uncontrolled and sudden decreases in vehicle deceleration forces. U.S. Pat. No. 6,631,955, issued Oct. 14, 2003, to Humer et al., discloses a variable movement headrest to provide head support to a vehicle occupant by quickly decreasing a gap between an occupant's head and the headrest.

U.S. Pat. No. 7,588,289, issued Sep. 15, 2009, to Bostrom et al., discloses a vehicle seat having a headrest that moves forward in a manner depending on the severity of an impact. U.S. Patent Application Publication No. 2009/0108645, published Apr. 30, 2009, by Nilakantan, teaches an active head restraint system that is actuated before an occupant is thrown rearward against a backrest. U.S. Pat. No. 6,022,074, issued Feb. 8, 2000, to Swedenklef, teaches a seat suitable for damping the effects of high-pressure impact against the seat backrest by an occupant of the seat, which seat includes a backrest element mounted on squab for pivotal relative movement to the squab.

U.S. Pat. No. 7,354,106, issued Apr. 8, 2008, to Dennis, discloses a vehicle safety seat useful in aircraft and small sea-going vessels, in which a seated occupant is accelerated upward a fraction of a second after crash impact, thereby reducing downward velocity and avoiding compressive axial forces on the spine. U.S. Pat. No. 5,553,924, issued Sep. 10, 1996, to Cantor et al., discloses a contoured seat bottom with an energy-absorbing foam layer covered by a second foam layer having a rate sensitive compression characteristic. U.S. Pat. No. 3,953,068, issued Apr. 27, 1976, to Porsche et al., discloses a passenger seat having a backrest pivotally attached to a seat rest in which energy absorption devices dissipate and absorb collision and/or deceleration forces acting on the seat or a passenger in the seat. U.S. Pat. No. 5,556,160, issued Sep. 17, 1996, to Mikami, discloses a seat bottom that rotates from a seating position to an inclined position, in which the rear of the seat bottom is below the knees of a seated person, in order to prevent the seated person from being flung forward by forces of inertia. U.S. Pat. No. 6,851,747, issued Feb. 8, 2005, to Swierczewski, discloses a collapsible vehicle safety seat designed upon impact to lower the center of gravity of an occupant.

U.S. Pat. No. Re. 35,572 issued on Jul. 29, 1997 to Lloyd et al. discloses a seat assembly for a motor vehicle that includes an air suspension system for isolating the occupant of the seat from shock, vibration and inertial forces directed along both vertical and horizontal axes. A base plate is mounted to the floor of the vehicle and supports first and second pairs of sleeve bearings on sides of a box-like housing. The housing is attached to a pair of guide rods, which cooperate with the sleeve bearings to provide fore and aft movement of the housing. Springs operating in cooperation with a first horizontally disposed airbag serve to dampen out inertial forces to the vehicle seat. The seat itself is supported on a vertically oriented air spring and a plurality of hydraulic vibration dampeners that tend to cushion vertically directed forces acting upon the seat and its occupant.

U.S. Pat. No. 2,227,717 issued on Jan. 7, 1941 to Jones relates to a structure for mounting a chair to the body of an airplane. The structure is designed to move the chair forward and upward in the event of collision, whereby the person occupying the chair will be tossed in a curved path and thus relieved substantially from shock caused by the collision forces. U.S. Pat. No. 3,081,059 issued on Mar. 12, 1963 to Hastings et al. is drawn to a seat base having an inverted cone secured to the underside of the seat. The front legs of the seat are pivotally mounted to the floor of the vehicle. A single rear leg telescopes against the action of a spring.

U.S. Pat. No. 4,275,914 issued in Jun. 30, 1981 to Holweg et al., discloses an arresting device in a longitudinally adjustable guide rail assembly for motor vehicle seats. The device includes a shaft rotatable supported in a stationary bearing plate and driven by a stationary electromotor. The driving pinion of the electromotor is in mesh with an intermediate gear, which is supported for joint rotation on the shaft. A coupling disk is supported for joint rotation on the shaft and for axial displacement between the bearing plate and the face of an intermediate gear. U.S. Pat. No. 5,292,179 issued on Mar. 8, 1994 to Forget, discloses a fixed plate supporting a vehicle seat that is secured to longitudinal adjusting slides. The fixed plate supports a rotary intermediate plate via a first ball bearing and a cover rigidly connected to the fixed plate and supported at the rotary intermediate plate via a second ball bearing.

U.S. Pat. No. 5,344,204 issued on Sep. 6, 1994 to Liu, discloses a safe driver seat unit that includes a seat supported on two rails by four ball bearings mounted in the seat legs, and an arrangement wherein an electromagnetic controller locks the seat in normal position. In a collision, sensors will turn on power to unlock the seat so that springs may move the seat. U.S. Pat. No. 5,605,372 issued on Feb. 25, 1997 to Al-Abdullateef, discloses an automotive safety seat that reduces g-loads imparted to an occupant during a collision by absorbing some of the energy of impact. Kinetic energy is converted to potential energy with the elevation of the seat and its occupant and the compression of springs. U.S. Pat. No. 5,743,591 issued on Apr. 28, 1998 to Tame, discloses a vehicle seat, which includes a seat cushion assembly and a hydraulic actuator. A first mounting assembly is constructed and arranged to mount the seat cushion assembly on a vehicle floor, and a second mounting assembly is provided which is constructed and arranged to mount a seat back assembly on the seat cushion assembly. U.S. Pat. No. 6,851,747 issued on Feb. 8, 2005 to the present inventor teaches a collapsible vehicle safety seat supported on a pilotable linkage. On vehicle impact or a signal indicating imminent impact, the linkage releases to drop the vehicle seat and the occupant to an angled position, reducing movement due to high deceleration forces.

German Patent No. 2,112,443 published Sep. 23, 1971, discloses a vehicle passenger safety system which has seat belt anchorages and/or the seat rear anchorage points attached through energy absorbing components so that each passenger describes a predetermined path within the compartment with an increasing braking force until suitable padding brings the passenger to a safe stop. German Patent No. 2,060,951 published Jun. 22, 1972, discloses a car seat that is mounted on a spring-loaded support to absorb impact forces. The support is braced by either mechanical springs or hydraulic shock absorbers, and converts impact forces into a smooth recoil to protect the occupants in the event of a collision. Great Britain Patent No. 2,087,226 A published May 26, 1982, discloses a shock absorbing seat that is formed by two connected portions. The shorter rear portion is a flat metal sheet bent upward at the back and riveted to the rear cross-member of a tubular support frame.

SUMMARY OF THE INVENTION

An object of the present invention is to provide an apparatus, which benefits from vehicle systems to detect traffic emergencies and to automatically transform geometry horizontal support bottom panels with a cushion of the front row vehicle seat from a position decided by a seat occupant to an anticipated adjusted orientation constraining an occupant's kinematic movement, to prevent an occupant's ejection.

Another object of the present invention is to provide a vehicle seat apparatus that without a seat occupant's action is triggered, simultaneously with a sudden and uncontrolled change of vehicle kinetic energy.

Another object of the present invention is to provide a pneumatic cylinder interacting with an air pressure cartridge having a valve open automatically and simultaneously with a signal from a vehicle system detecting traffic emergencies, where the vehicle system may be the known Light Detection and Ranging (LiDAR).

Another object of the present invention is to provide a movable frustum alternatively replaced by pairs of rope which travel over a double flanged wheel mounting to a pneumatic cylinder to control a middle pivot joint responsible for adjusting horizontal seat support bottom panels with a cushion.

Another object of the present invention is to provide an additional horizontal support bottom panel which extends an occupant's interface versus a seat that is constructed by a cover gap between an adjusted rear crossbar and a lower rod backrest.

All of the above as well other objects of present invention will become readily apparent further upon review of the following specification and drawings.

BRIEF DESCRIPTION OF THE DRAWINGS

Similar reference characters denote corresponding features consistently throughout the attached drawings and detailed specification.

DETAILED DESCRIPTION OF THE DRAWINGS

Figure 1:
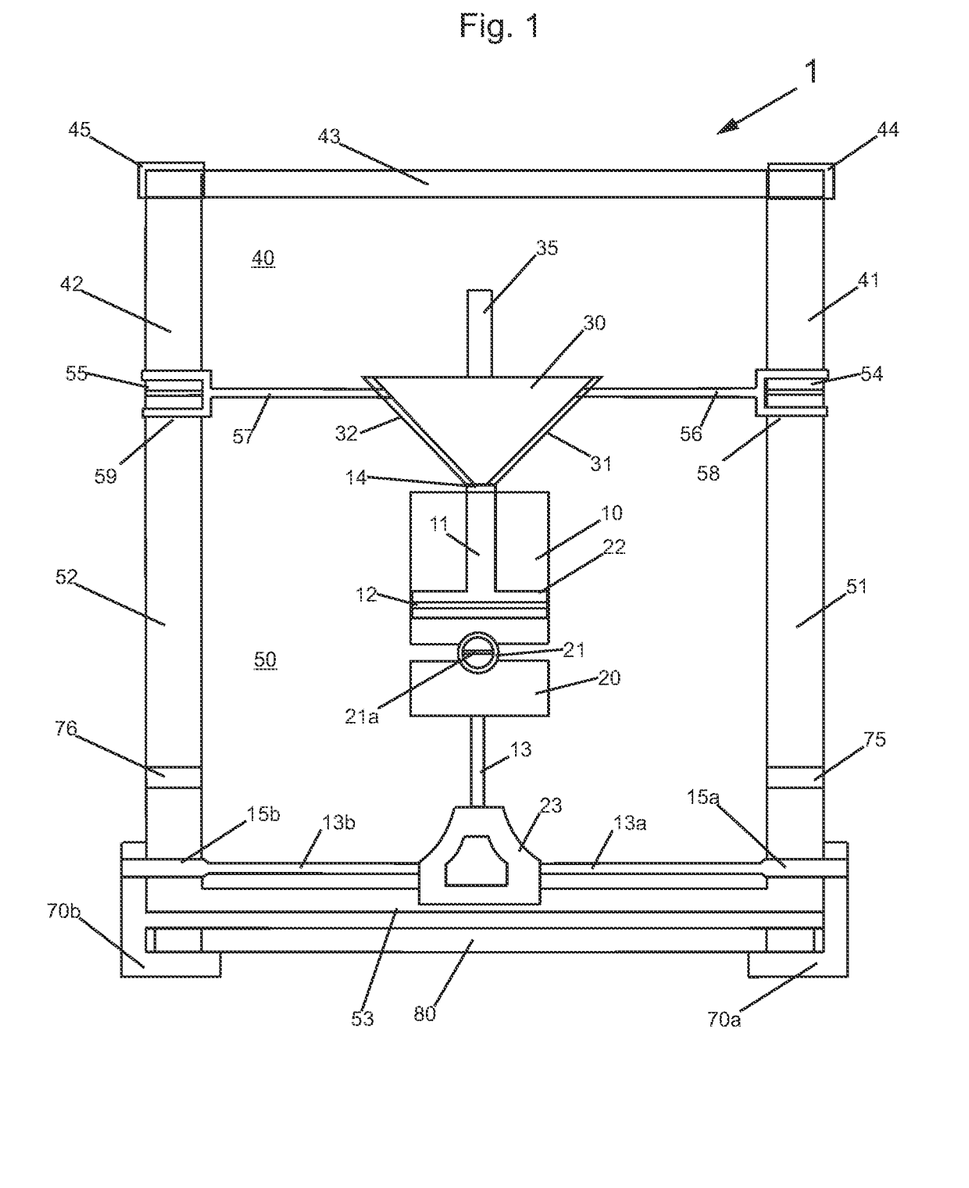
FIG. 1 is a top view of a vehicle seat pneumatic cylinder and major interacting embodiment in a normal position in accordance with an embodiment of the present invention.

FIG. 1 shows a top schematic view of a vehicle seat apparatus 1, which contains major components of a front vehicle seat including a movable frustum 30 interacting with a right rigid crossbar 56 and a left rigid crossbar 57 as well horizontally supporting bottom panels 40 and 50 that are held in motionless locations as determined by a seat occupant during a non-emergency of normal driving of a vehicle such as an automobile.

Figure 2:
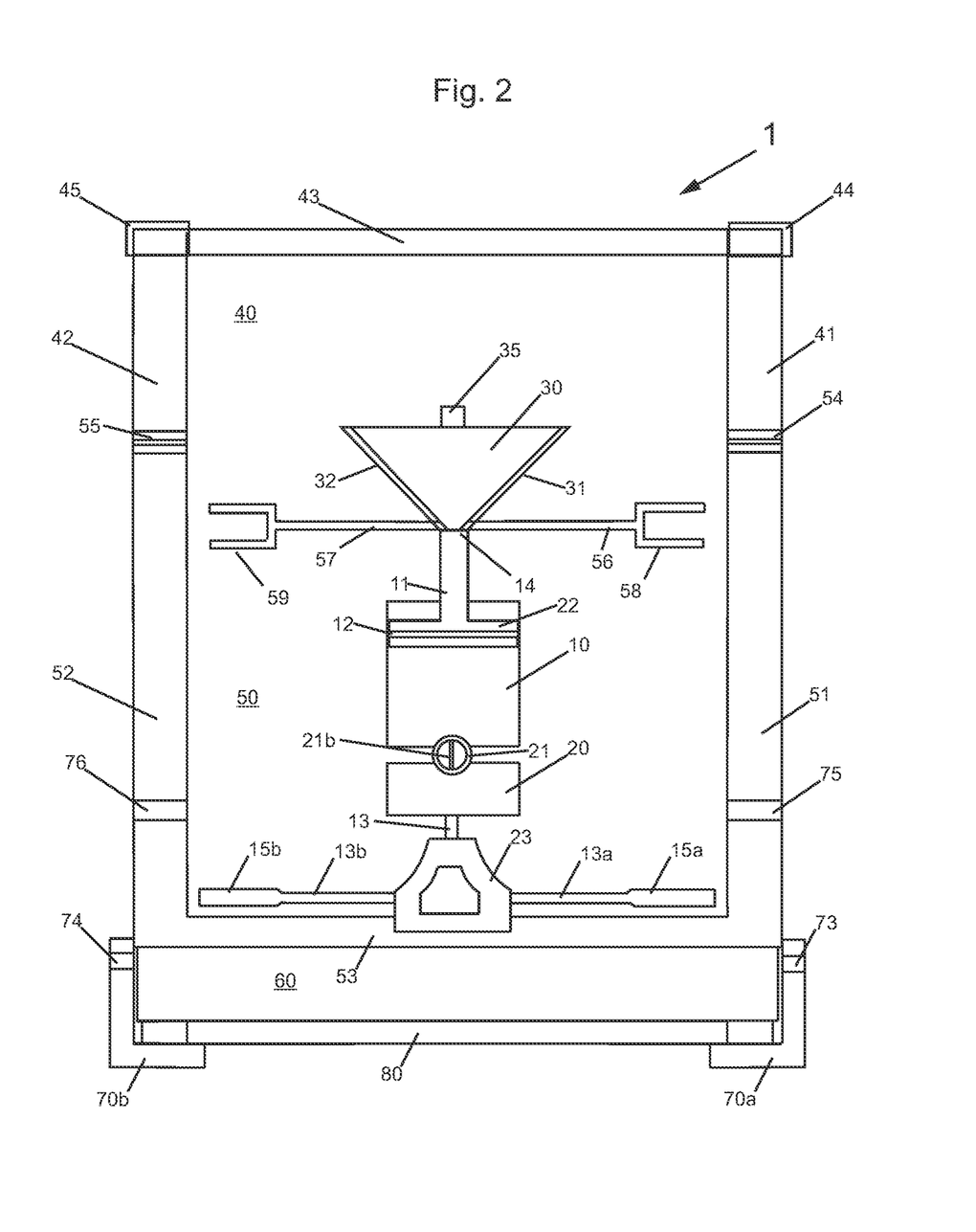
FIG. 2 is a top view of the vehicle seat pneumatic cylinder and major interacting embodiment of FIG. 1, in a deployed position or state.
Figure 9:
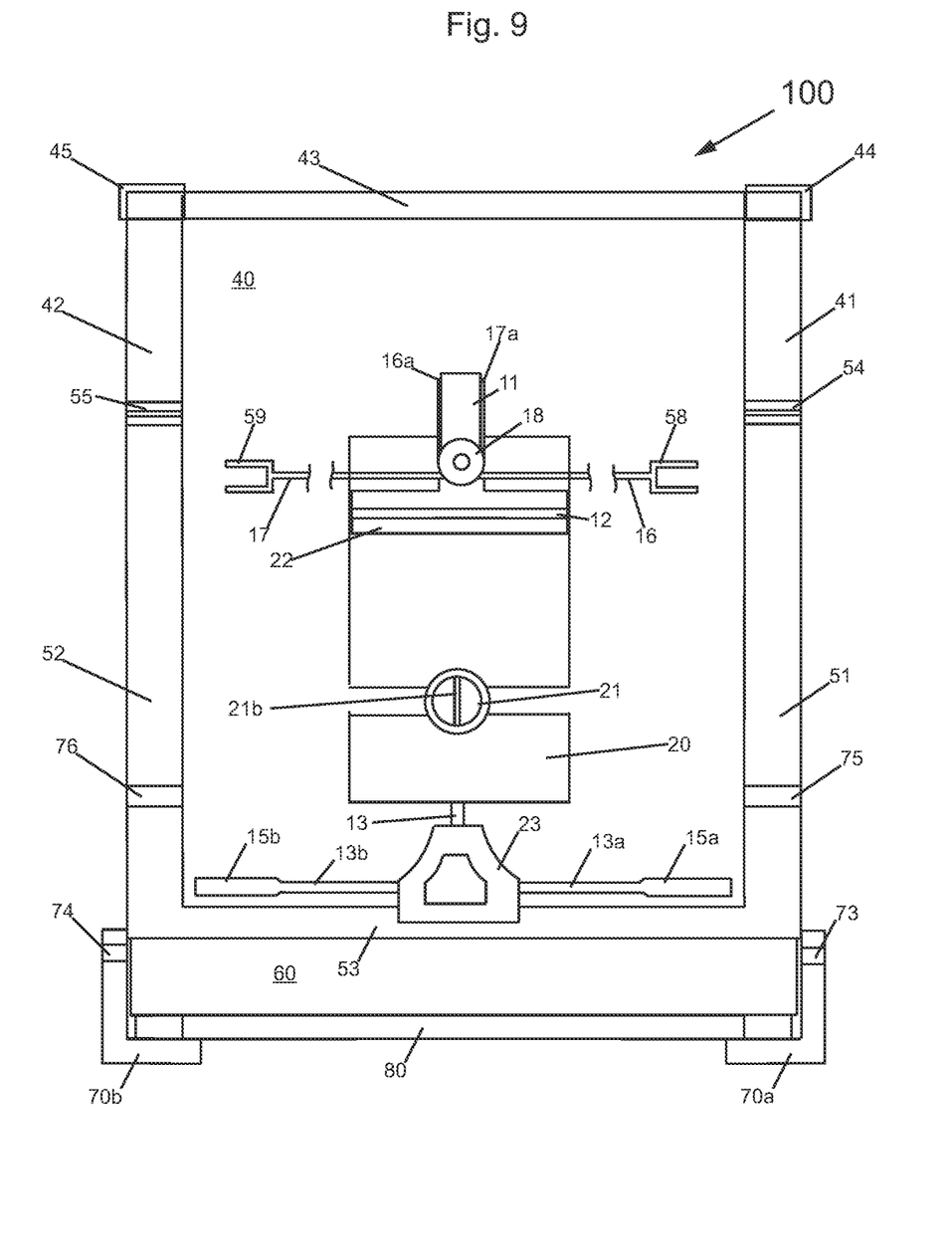
FIG. 9 shows a top view of the vehicle seat pneumatic cylinder and major interacting embodiment of FIG. 8, in a deployed position or state.
Figure 10:
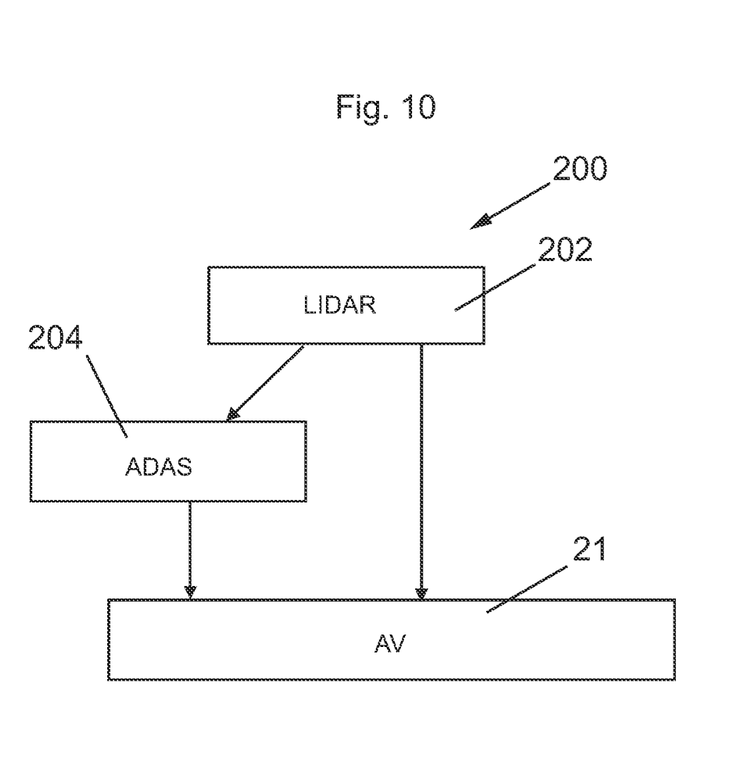
FIG. 10 shows a simplified block diagram of a vehicle system for detecting traffic emergencies.

FIG. 2 shows a top schematic view of the apparatus 1 in a state where a car or vehicle system 200 exhibited in FIG. 10 detects a traffic emergency. The vehicle seat apparatus 1 includes a pneumatic cylinder 10 interacting with an air pressure cartridge 20. The vehicle seat apparatus 1 controls the first horizontally supporting bottom panel 40, the second horizontally supporting bottom panel 50, and creates a third panel 60. The third panel 60 shown in FIGS. 2, 7, and 9 increases the interface of an occupant versus a seat. Extending the length of the seating area causes a smaller and slower occupant response to a sudden and uncontrolled vehicle deceleration force. The adjusted location of the horizontally supporting bottom panels 40 and 50 with cushion causes an occupant's biomechanics to prevent their ejection and to stop what is known as "the third collision". The first horizontally supporting bottom panel 40 has a right side frame 41 and a left side frame 42. The panel 40 has a front end crossbar 43. The apparatus 1 has a right pivot 44 located on the right end of the crossbar 43 and a left pivot 45 positioned on a left end of the crossbar 43.

Figure 3:
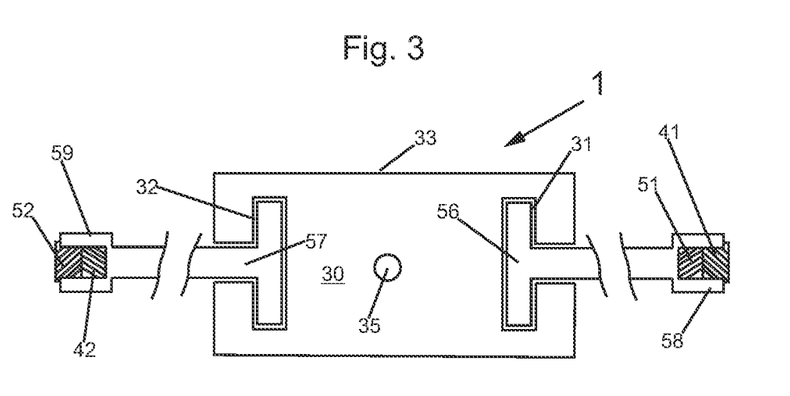
FIG. 3 is a view of a movable frustum rectangular base and interacted components in the normal position.
Figure 4:
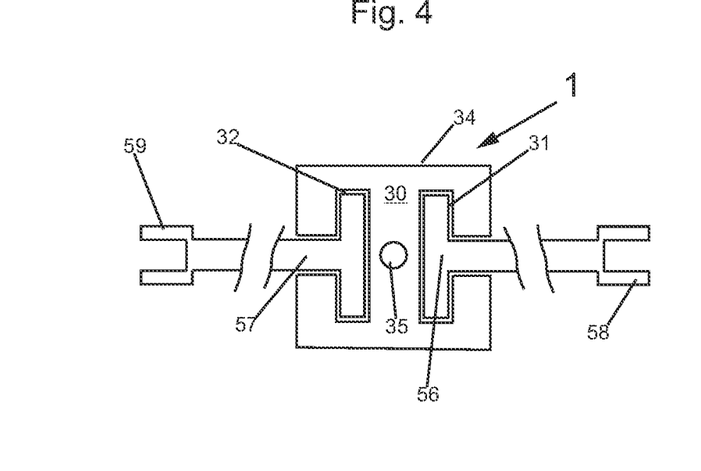
FIG. 4 is a view of the movable frustum rectangular base and the interacted components in an adjusted position.
Figure 5:
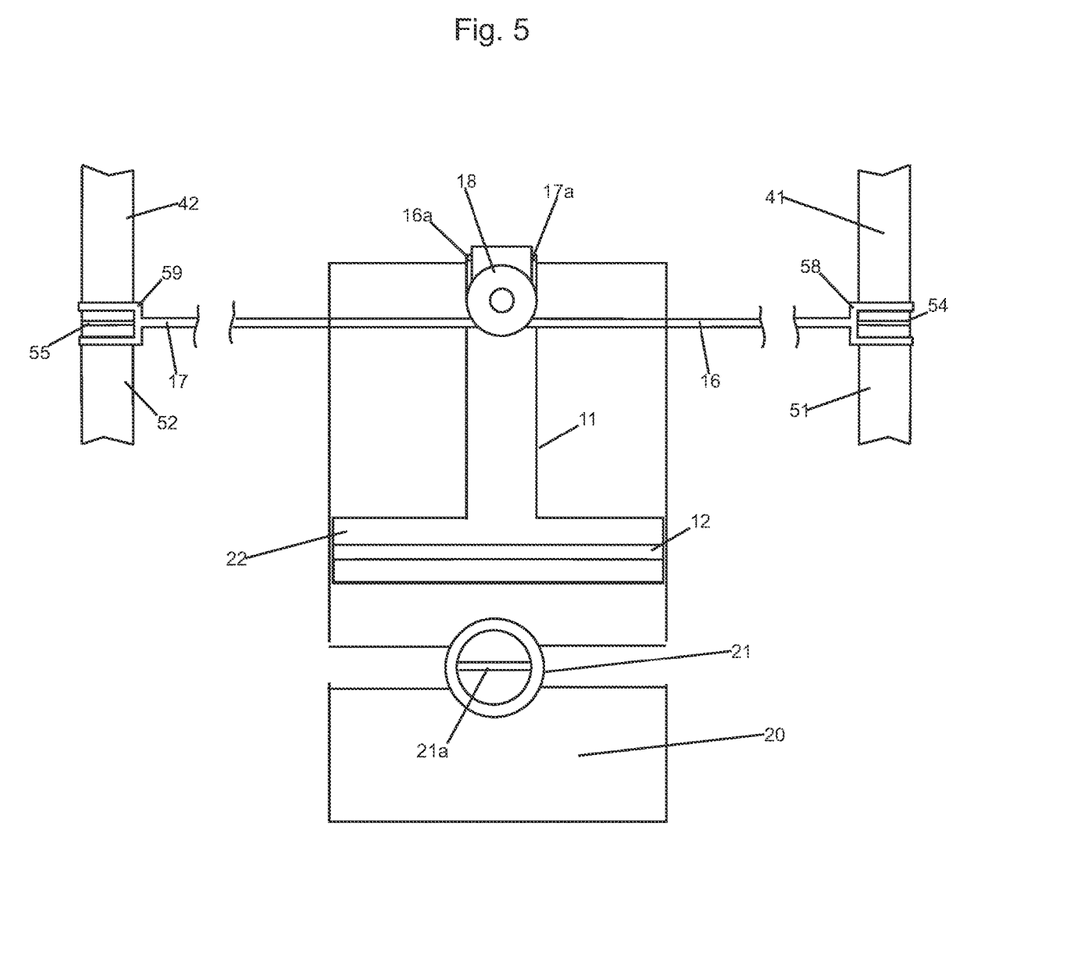
FIG. 5 is a top view of a second pair of ropes of the vehicle seat apparatus in the normal position.
Figure 6:
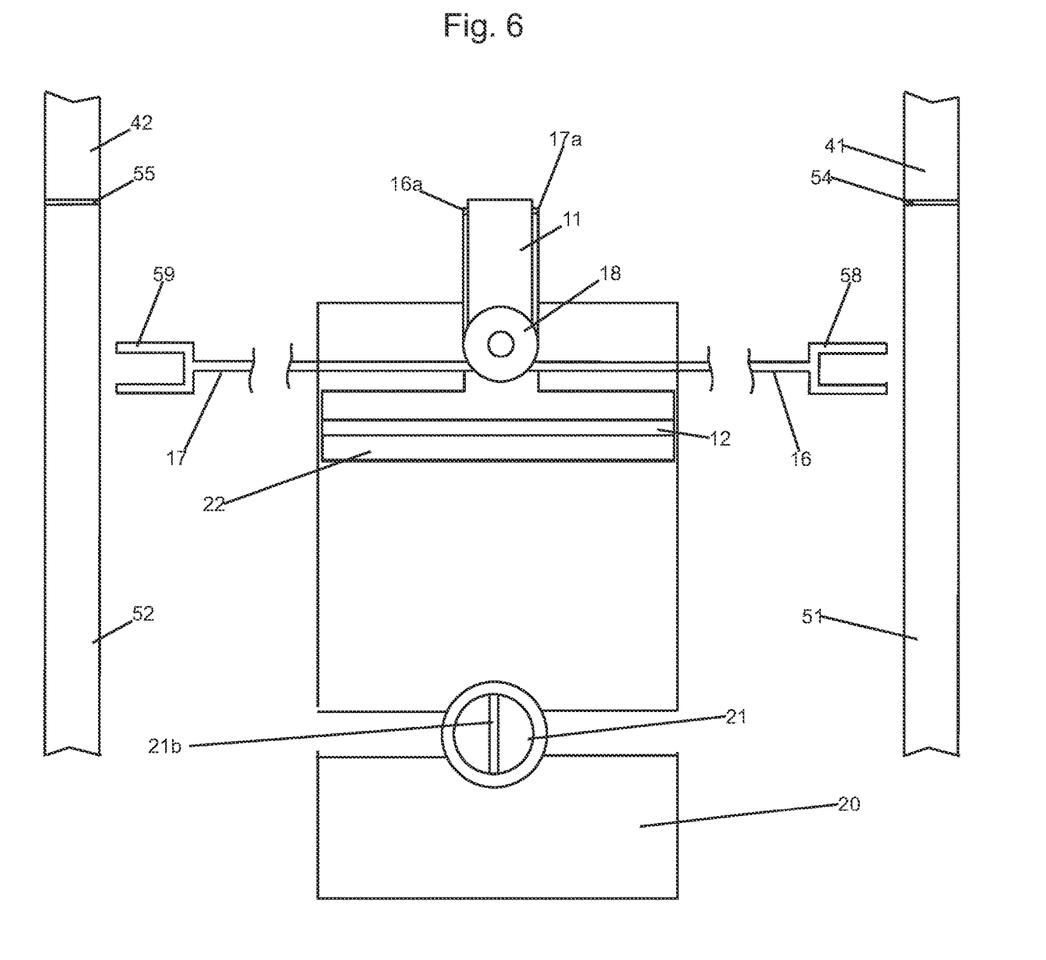
FIG. 6 is a top view the second pair of ropes of the vehicle seat apparatus in the adjusted position.

The second horizontally supporting bottom panel 50 has a right side frame 51, a left side frame 52 and a rear end crossbar 53. A rear end of the right frame 41 is connected to a front end of the right frame 51 by a right middle pivot joint 54. A rear end of the left frame 42 is connected to a front end of the left frame 52 by a left middle pivot joint 55. The pneumatic cylinder 10 and the air pressure cartridge 20 are conventionally attached under a centerline of the second horizontally supporting bottom panel 50. The pneumatic cylinder 10 has a tethered connection with the air pressure cartridge 20. Between the pneumatic cylinder 10 and the air pressure cartridge 20 is an automatic valve (AV) 21. The automatic valve 21 in a closed state is referred to as 21a as shown in FIGS. 1, 5, and 9 and in an open state is referred to as 21b as shown in FIGS. 2, 6, and 8. The valve 21 in the state of 21b is opened simultaneously by a signal from a known vehicle traffic emergency detection system, most likely a Light Detection and Ranging (hereinafter "LiDAR") device 202, shown in a simplified block diagram format in FIG. 10. The LiDAR) device 202 includes an optical system that emits the compound of a laser light with a wavelength from a vehicle to the traffic obstacle. A LiDAR device 202 method or algorithm calculates a time between sending and receiving the light to determine the distance between a vehicle (typically an automobile, motorcycle, or truck) and an obstacle on the road. The heterogeneous platform LiDAR device 202 is Integrated with a known Adaptive Driver Assistance Systems (hereinafter "ADAS") 204 as shown in simplified block diagram format in FIG. 10. The ADAS 204 helps operating vehicles in many ways such as for instance adaptive cruise control. In the present invention the LiDAR 202 provides lightning-fast, redundant communication via ADAS 204 to the automatic valve (AV) 21. Alternatively, as shown FIG. 10, the signal configured by LiDAR 202 is sent directly to the automatic valve (AV) 21. The closed position 21*a* of the automatic valve 21 holds the vehicle seating system apparatus 1 of FIG. 1 or the apparatus 100 of FIG. 8 in position decided by the seat occupant. The open automatic valve position 21*b* of the valve 21 shown in FIG. 2 transfers the compressed air from the cartridge 20 to the pneumatic cylinder 10 without any involvement of the seat occupants. The pneumatic cylinder 10 contains a piston 22 connected with a rod 11. The piston 22 has a sealing ring 12 to control and to force compressed air inside the pneumatic cylinder 10. The rod 11 is conventionally connected with a movable frustum 30. The movable frustum 30 has a right T-shaped channel 31 interacting with a T-shaped inner end of the rigid middle crossbar 56. The movable frustum 30 has a left T-shaped channel 32 interacting with a T-shaped inner end of the left rigid middle crossbar 57. The rigid middle crossbar 56 is located on a right side of the frustum 30. The rigid left middle crossbar 57 is located on the left side of the frustum 30. The right part of the middle crossbar 56 has a U-shaped right end 58 that immobilizes the right pivot joint 54. The left part of the middle crossbar 57 has a U-shaped left end 59 that immobilizes the left pivot joint 55. The apparatus 1 further includes a first pair of ropes 13 which travel out of the pneumatic cylinder 10 through a divided pipe 23. The first pair of ropes 13 front end is attached to a smaller area of the movable frustum 30 at point 14. Each of the apparatus 1 and 100 has a pipe 23 divided with rope 13 having a right part 13*a* and a left part 13*b*. The right part 13*a* of the rope 13 has a rear end pin 15*a* that fills the right opening 73 located in the seat right structure 70*a* which partly determines seat height adjustment. The left part 13*b* of the rope 13 has the rear end pin 15*b* fills the left opening 74 located in the left structure 70*b* which partly determines the seat height adjustment. The divided pipe 23 changes the direction of the rope 13 from perpendicular to parallel with respect to the front crossbar 43 shown in FIGS. 1,2 and 7. The divided pipe 23 is conventionally attached to the rear crossbar 53. As best seen in FIGS. 3 and 4 the movable frustum 30 has a rectangular first base 33 and a second rectangular base 34. The second rectangular base 34 of the frustrum 30 is at least fifty percent smaller than rectangular first base 33 of the frustum 30. The movable frustum 30 has a right T-shaped channel 31 to interact with the right T-shaped inner end of the rigid middle crossbar 56. The movable frustum 30 has a left T-shaped channel 32 to interact with the left T-shaped inner end of the rigid middle crossbar 57. The movement frustum 30 over a runner 35 causes the rigid middle crossbar 56 U-shaped outer right end 58 to untie the right middle pivot joint 54. The movement frustum 30 causes the rigid middle crossbar 57 U-shaped outer left end 59 to untie the left middle pivot joint 55. Releasing the middle pivot joints 54 and 55 permits the horizontally supporting bottom first panel 40, and the second panel 50 to change their geometrical orientation.

Figure 7:
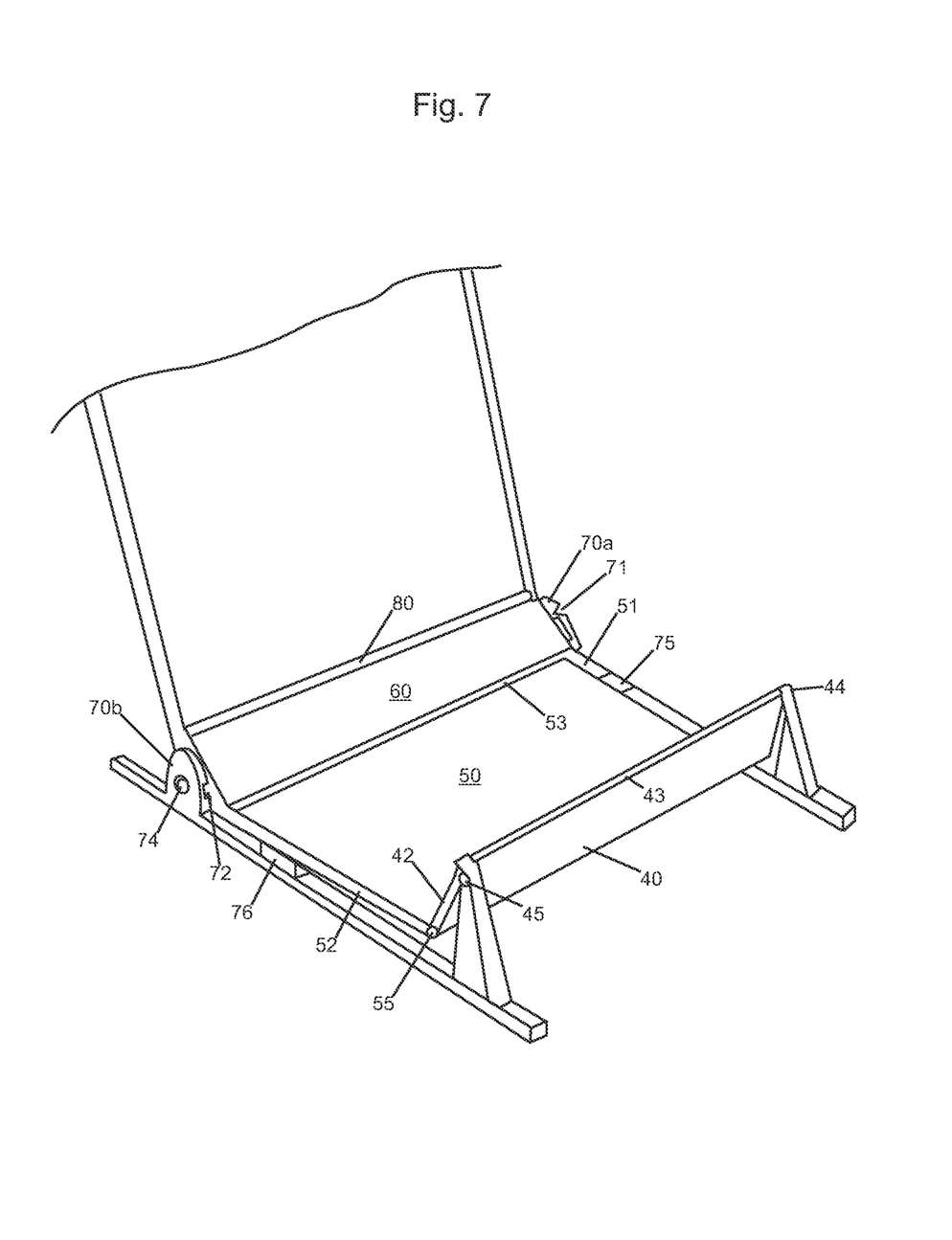
FIG. 7 is a perspective view of horizontal support bottom panels of the vehicle seat horizontal support bottom panels in the adjusted position.
Figure 8:
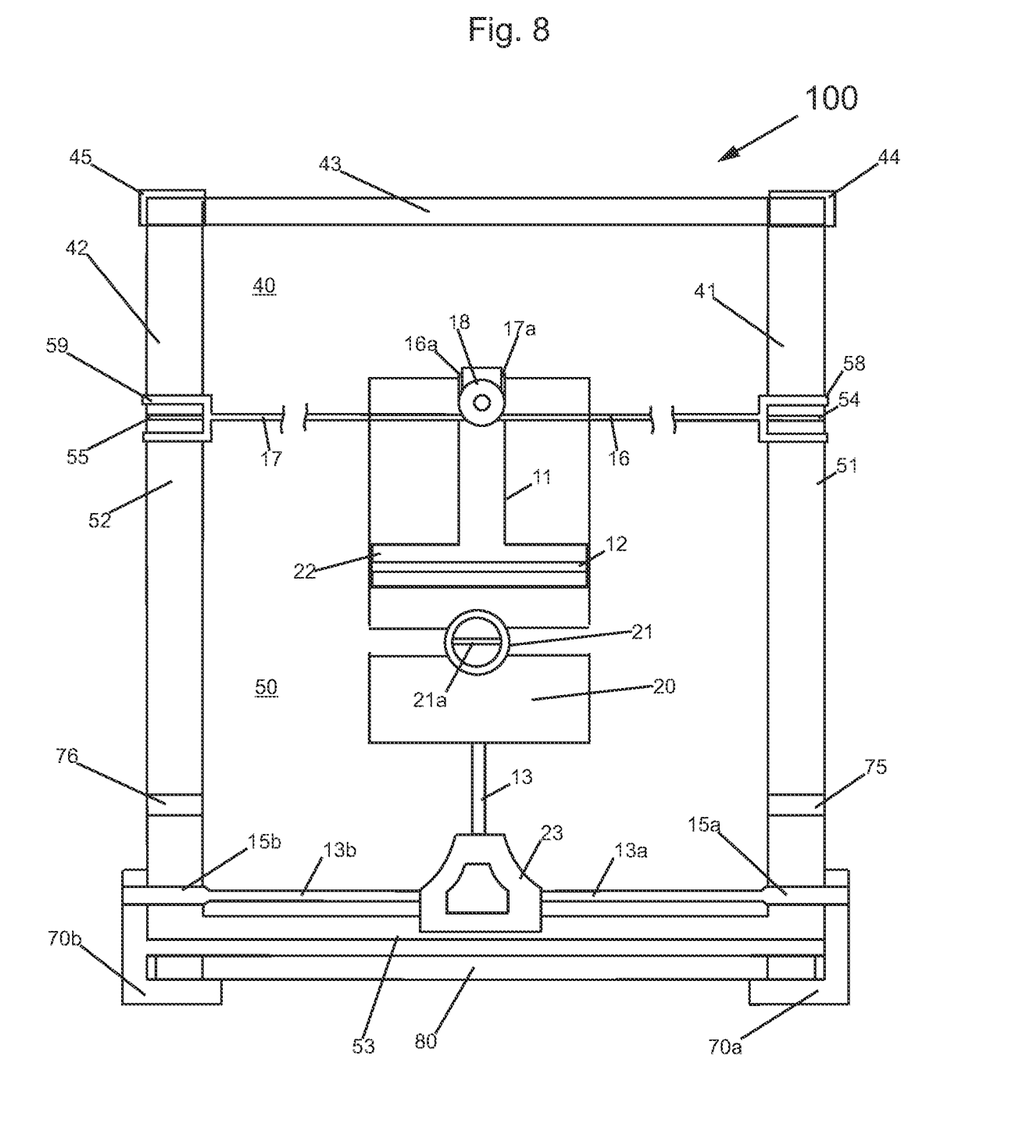
FIG. 8 shows a top view of an alternative vehicle seat pneumatic cylinder and major interacting embodiment in a normal position, where components of FIG. 5 have replaced various components in FIG. 1.

During normal driving the rear crossbar 53 fills the right niche 71 formed by the seat height right structure 70*a* and the left niche 72 formed by the seat height left structure 70*b* as shown in FIG. 7. As shown in FIG. 2 the movement of the rope 13 toward the front crossbar 43 causes the right part 13*a* of the rope 13 to withdraw the pin 15*a* from the right opening 73 located in the structure 70*a*. Concurrently, the left part 13*b* of the rope 13 withdraws the pin 15*b* from the left opening 74 located in the structure 70*b*. Simultaneously with withdrawing of the pins 15*a* and 15*b*, the crossbar 53 is allowed to move in an anticipated slope movement. The distance between the stable lowest bar of the backrest 80 and an adjusted location of the rear crossbar 53 creates the third horizontal support bottom panel 60 as shown in FIG. 2 and FIG. 9. The third panel 60 extends the length of the seating area and provides more time for an occupant to respond to the sudden and uncontrolled change of vehicle deceleration forces. The longer seating area allows an occupant a slower and smaller reaction that minimizes biomechanics to diminish the so called "third collision" and to prevent an occupant's ejection from the vehicle seat. The third horizontal support bottom panel 60 typically has a soft cover. The second horizontally supporting bottom frames right 51 and left 52 have, respectively, lock mechanisms right 74 and left 75. Alternatively, FIGS. 5 and 6 show components which are used in the apparatus 100 shown in FIGS. 8 and 9. FIGS. 8 and 9 show an automatically adjusted vehicle seat which includes a second pair right rope 16*a* and a left rope 17*a* interacting with a double flanged wheel 18 mounted to a pneumatic cylinder 10. Instead of frustum 30 which interacts with rigid middle crossbars right 56 and left 57 as shown in FIGS. 1, 2, 3, and 4. The apparatus 100 shown in FIGS. 5 and 6, provides the right rope front end 16*a* and left rope front end 17*a* attached to the top of movable rod 11. Simultaneously with the valve 21 in the open state 21*b*. the rod 11 is moved toward the seat front crossbar 43 and pulls out the right rope part 16 and left rope part 17 to travel through the double flanged wheel 18 which is mounted to the pneumatic cylinder 10. The double flanged wheel 18 serves in a similar way as the movable frustum 30. The rope front right end 16*a* is attached to the top movable rod 11 left side. The ropes front left end 17*a* is attached to the top movable rod 11 right side. The right rope 16 and the left rope 17 have outer U-shaped ends right 58 and left 59 and control corresponding middle pivot joints 54 and 55 in a similar way as shown FIGS. 1 and 2. The vehicle seat apparatus 100 of FIGS. 8 and 9 has benefits, similar to the apparatus 1 of FIGS. 1 and 2 from the vehicle system 200 for detecting traffic emergencies as shown FIG. 10. Signals from LiDAR 202 automatically open valve 21 into open state 21*a* that transfers the compressed air forces from the cartridges 20 to the pneumatic cylinder 10. Simultaneously with the movement of the rod 11 the first horizontal support bottom panel 40 and the second horizontal support bottom panel 50 adjust their geometrical orientation.

The first horizontally supporting panel 40 made a slope movement over the right front pivot 44 and the left front pivot 45. The front crossbar 43 stayed in its original unchangeable location. The middle pivot joint right 54 and middle pivot joint left 55 go down causing the first 40 and the second horizontally supporting bottom panels 50 to move toward the front crossbar 43. This disengages the rear crossbar 53 from the corresponding niche right 71 and left 72, forming the third horizontally supporting bottom panel 60. The niches 71 and 72, are located into the corresponding seat structure 70*a* and 70*b*, respectively of the seat height adjustment. The horizontally supporting bottom panel 60 is created concurrently with the withdrawal of pins 15*a* and 15*b* from corresponding right opening 73 and left opening 74 as shown in FIG. 2. The third panel 60 covers the gap between the rear crossbar 53 and the lowest bar of the seat backrest 80. The horizontally supporting bottom second panel 50 has the sides lock up mechanism right 75 and lock up mechanism left 76. The useful air pressure cartridge 20 is manually disconnected and replaced from the pneumatic cylinder 10 to restore all components seat apparatus 1 of FIGS. 1 and 2 and apparatus 100 of FIGS. 8 and 9 to return to its original stage.

A list of various components and identifying numbers in apparatus 1 is shown below:
- 10—pneumatic cylinder
- 11—movable rod
- 12—piston sealing ring
- 13—rope
- 13a—rope right side
- 13b—rope left side
- 14—rope front end
- 15a—rope rear end right pin
- 15b—rope rear end left pin
- 20—air pressure cartridge
- 21—automatic valve (AV)
- 21a—AV off
- 21b—AV on
- 22—piston
- 23—divided pipe
- 30—frustum
- 31—frustum first area
- 32—frustum second area
- 33—frustum T-shaped right channel
- 34—frustum T-shaped left channel
- 35—frustum runner
- 40—first (front) panel horizontal support bottom
- 41—first panel right frame
- 42—first panel left frame
- 43—front crossbar
- 44—front pivot right
- 45—front pivot left
- 50—second (middle) panel horizontal support bottom
- 51—second panel frame right
- 52—second panel frame left
- 53 second panel rear crossbar
- 54—middle pivot joint right
- 55—middle pivot joint left
- 56—middle rigid crossbar right
- 57—middle rigid crossbar left
- 58—right U-bolt outer end
- 59—left U-bolt outer end
- 60—third (rear) panel horizontal support bottom
- 70a—seat height structure right
- 70b—seat height structure left
- 71—seat right niche
- 72—seat left niche
- 73—right opening
- 74—left opening
- 75—locking mechanism right
- 76—locking mechanism left
- 80—backrest lower bar
- 202—Light Detection and Ranging (LiDAR)
- 204—Adaptive Driver Assistance System (ADAS)

A list of various components and identifying numbers shown in FIGS. 5 and 6 for use in apparatus 100 shown in FIGS. 9 and 10 is shown below:
- 10—pneumatic cylinder,
- 11—movable rod
- 12—sealing ring
- 13—rope
- 13a—rope right side,
- 13b—rope left side,
- 14—rope front end,
- 15a—rope rear end right pin
- 15b—rope rear end left pin
- 16—second pair rope right
- 16a—second pair rope right top end
- 17—second pair rope left
- 17a—second pair rope left top end
- 18—double flanged wheel
- 20—air cartridge,
- 21—automatic valve (AV)
- 21a—AV off
- 21b—AV on
- 22—movable piston
- 23—divided pipe
- 40—first (front) panel horizontal support bottom
- 41—first panel right frame
- 42—first panel left frame
- 43—first panel crossbar
- 44—front pivot right
- 45—front pivot left
- 50—second (middle) panel horizontal support bottom
- 51—second panel right frame
- 52—second panel left frame
- 53 second panel rear crossbar
- 54—middle pivot joint right
- 55—middle pivot joint left
- 58—U-bolt outer end right
- 59—U-bolt outer end left
- 60—third (rear) panel horizontal support bottom
- 70a—seat height structure right
- 70b—seat height structure left
- 71—right niche
- 72—left niche
- 73—right opening
- 74—left opening
- 75—locking mechanism right
- 76—locking mechanism left
- 80—backrest lower bar
- 202—Light Detection and Ranging (LiDAR)
- 204—Adaptive Driver Assistance System (ADAS)

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present inventions contribution to the art.

The present invention is, of course, in no way restricted to the specific disclosure of the specification and drawings, but also encompasses any modifications within the scope of the appended claims.

I claim:

1. A vehicle seat apparatus comprising:
   a front seat;
   a movable frustum;
   a divided pipe;
   a first pair of rope; and
   wherein the first pair of rope front end is connected to the movable frustum;
   wherein a rear end of the first pair of rope travels through the divided pipe;
   wherein the divided pipe changes direction of the rear end of the first pair rope from perpendicular to parallel with respect to the front seat.

2. The vehicle seat apparatus of claim 1 wherein
   the rear end of the first pair of rope has a movable pin connected thereto that fills an opening located in a first horizontal support bottom panel to determine a seat height adjustment, and wherein the movable pin controls a location of a rear crossbar into a niche formed by a seat height adjustment mechanism.

3. A vehicle seat apparatus comprising
a front seat;
a pneumatic cylinder;
a divided pipe;
a first pair of rope;
a second pair of rope;
a double flanged wheel; and
a top piston with rod; and
wherein the second pair of rope has an inner end and an outer end, each having a front end;
wherein the front end of the inner end of the second pair of rope is connected with the top piston with rod;
wherein the second pair of rope travels through the double flanged wheel; and
wherein the double flanged wheel mounts to the pneumatic cylinder.

4. The vehicle seat apparatus of claim 3 further comprising: a middle pivot joint; and wherein the second pair of rope has a rear end; wherein rear end of the second pair of rope has a U-shaped outer end which controls the middle pivot joint which holds a first horizontal support bottom panel and a second horizontal support bottom panel together.

* * * * *